United States Patent [19]

Takanashi et al.

[11] Patent Number: 4,977,462
[45] Date of Patent: Dec. 11, 1990

[54] APPARATUS FOR CORRECTING A TIME BASE ERROR IN A VIDEO SIGNAL

[75] Inventors: Kenji Takanashi; Yoshiaki Wakisaka, both of Kanagawa, Japan

[73] Assignee: Sony Corporation, Tokyo, Japan

[21] Appl. No.: 171,030

[22] Filed: Mar. 21, 1988

[30] Foreign Application Priority Data

Mar. 24, 1987 [JP] Japan ................................ 62-069950
Mar. 24, 1987 [JP] Japan ................................ 62-069953

[51] Int. Cl.⁵ ............................................. H04N 5/95
[52] U.S. Cl. .................................... 358/339; 358/314; 360/36.2
[58] Field of Search ................... 358/17, 19, 148, 150, 358/158, 310, 314, 320, 321, 322, 326, 327, 336, 337-339; 360/9.1, 36.1, 36.2, 38.1

[56] References Cited

U.S. PATENT DOCUMENTS

| 4,035,832 | 7/1977 | Stalley et al. | 358/339 X |
|---|---|---|---|
| 4,065,787 | 12/1977 | Owen et al. | 358/339 X |
| 4,084,176 | 4/1978 | Trost | 358/339 X |
| 4,133,009 | 1/1979 | Kittler et al. | 358/337 X |
| 4,165,524 | 8/1979 | Ninomiya | 358/339 X |
| 4,214,262 | 7/1980 | Mizukami | 358/19 |
| 4,287,529 | 9/1981 | Tatami et al. | 360/36.2 X |
| 4,393,413 | 7/1983 | Kaneko | 358/19 X |
| 4,443,821 | 4/1984 | Kato | 358/326 |
| 4,709,276 | 11/1987 | Yoshinaka | 358/326 |
| 4,714,965 | 12/1987 | Yoshinaka et al. | 358/339 X |
| 4,733,311 | 3/1988 | Yoshinaka | 358/337 X |
| 4,774,594 | 9/1988 | Urata | 360/36.2 X |
| 4,780,770 | 10/1988 | Wagner | 358/326 X |
| 4,802,026 | 1/1989 | Kaneko et al. | 358/320 X |
| 4,841,379 | 6/1989 | Akiyama | 358/339 X |

Primary Examiner—Aristotelis M. Psitos
Assistant Examiner—W. R. Young
Attorney, Agent, or Firm—Alvin Sinderbrand

[57] ABSTRACT

In a time base correcting apparatus in which incoming video signals are written into a memory by write clock signals modulated by time base errors and the written video signals are read from the memory by read clock signals modulated by the velocity errors; the write clock signals and the read clock signals have different frequencies and fluctuations in the sampling positions due to the frequency differential between the write clock signals and the read clock signals are corrected by the phase modulation of the read clock signals.

5 Claims, 3 Drawing Sheets

FIG. 1 *(PRIOR ART)*

APPARATUS FOR CORRECTING A TIME BASE ERROR IN A VIDEO SIGNAL

BACKGROUND OF THE INVENTION

1. Field of the Invention

This invention relates to a time base correcting apparatus in which incoming video signals are written into a memory by write clock signals modulated by time base errors and in which these written video signals are read out from the memory by read clock signals modulated by the velocity error to compensate for the time base error contained in the incoming video signals.

2. Description of the Prior Art

In general, signal recording and/or reproducing apparatus adapted for recording and/or reproducing signals by a rotary head device is subject to time base fluctuations resulting from eccentricity or irregular rotation of the rotary head or from fluctuations in the running speed of the recording medium. For high quality reproduction, it is necessary to compensate for these time base fluctuations contained in the reproduced signals. Especially, in a so-called direct FM recording type video tape recorder in which the video signals are directly frequency modulated prior to recording, residual jitters may give rise to irregular color, so that a time base correcting apparatus with an extremely high accuracy is necessitated.

For correcting the time base errors of the reproduced video signals in a VTR, a time base correcting apparatus shown for example in FIG. 1 has been used, in which the reproduced video signals are written in a memory with write clock signals modulated by the time base errors, and these written video signals are read out from the memory by the read clock signals modulated by the velocity error to correct the time base errors contained in the playback video signals.

In the conventional time base correcting apparatus shown in FIG. 1, the reproduced video signals including time base fluctuations are supplied through a signal input terminal 1 to an analog to digital converter (A/D) converter 2, while being simultaneously supplied to a sync separation circuit 3 and to a burst gate 4.

The sync separation circuit 3 separates sync signals contained in the playback or reproduced video signals to supply horizontal sync signals thereof to an AFC (automatic frequency control) circuit 5. The burst gate circuit 4 separates the burst signals contained in the incoming reproduced signals to supply the thus separated burst signals to an APC (automatic phase control) circuit 6.

In the case of a time base correcting apparatus for use with a video signal according to the NTSC system, the AFC circuit 5 generates reproducing clock pulses having a frequency equal to 910 times the horizontal sync frequency (fh), or 910 fh, that is, equal to four times the subcarrier frequency (fsc), or 4 fsc, on the basis of the horizontal sync signals supplied from the sync separating circuit 3. The thus produced reproducing clock pulses are supplied from the AFC circuit 5 to the APC circuit 6, and the AFC circuit 5 also generates write start signals Ws at an interval of a horizontal scanning period (1 H), by frequency dividing the frequency of the reproducing clock pulses by 910. The thus produced write start signals Ws are supplied to a write address generating circuit 7. The APC circuit 6 also effects phase control in such a manner as to match the phase of the reproducing clock pulse from circuit 5 with that of the burst signal supplied from the burst gate circuit 4 to form write clock signals Wck with the frequency of 910 fh which are accompanied by phase fluctuations associated with time base errors of the aforementioned incoming video signals. The write clock signals Wch are supplied from the circuit 6 to the write address generating circuit 7 and to the A/D converter 2, while the circuit 6 simultaneously forms velocity error signals having the phase of said burst signals as the reference and supplying these velocity error signals to a phase modulating circuit 9 through an analog delay circuit 8.

The phase modulating circuit 9 is supplied with reference read clock signals Rck having the frequency of 910 fh from a reference clock generator 10 and operates to phase modulate the read clock signals Rck in dependence upon the velocity error signals supplied through the analog delay circuit 8 to supply the phase-modulated read clock signals to a read address generator 11 and to a digital to analog (D/A) converter 12.

In the above described conventional time base correcting apparatus, the write clock signals Wck generated in the APC circuit 6 with the frequency of 910 fh and accompanied by phase fluctuations associated with time base errors of the incoming reproduced video signals are used for writing in a memory 13 video data that are the digitized version of the incoming video signals obtained at the A/D converter 2. The reference read clock signals Rck produced at the reference clock generator 10 with the frequency of 910 fh so as to be free from time base errors are also used for reading the video data from the memory 13. These video data are then converted in the D/A converter 12 into corresponding analog signals so that the reproduced video signals corrected for time base errors are outputted at a signal output 14. The phase modulating circuit 9 phase modulates the read clock signals Rck in accordance with the velocity error signals to correct the velocity errors of the incoming reproduced video signals. The velocity error signals are supplied to the phase modulating circuit 9 through the aforementioned analog delay circuit 8 adapted to apply, to the aforementioned velocity error signals, a time delay corresponding to the time delay of the video data caused by the time difference between the write and read operations of the video data to and from the memory 13.

In the above described time base correcting apparatus, wherein the incoming video signals are written in the memory by write clock signals Wck modulated by time base errors, and the thus written video signals are read out from the memory by the reference read clock signals Rck modulated by the velocity errors for correcting the time base errors contained in the incoming video signals, the same frequency 910 fh is used for the frequency of the write clock signals Wck and for that of the read clock signals Rck. As a consequence, malfunctions occur due to interference between the two clock signals so that it is difficult with the conventional apparatus to achieve time base compensation of very high accuracy. Especially, in the direct FM recording type video tape recorder, it is necessary to perform time base correction with an extremely high accuracy so that the residual jitter is less than several nanoseconds. Although measures have been adopted to prevent occurrence of the above mentioned malfunction due to the interference of the two clock signals, for example, by providing the data write system and the data read system to and from the memory 13 on separate circuit boards or by providing suitable shields, such measures interfere with the desired reduction in in the costs and the size of the time base correcting apparatus.

OBJECTS AND SUMMARY OF THE INVENTION

It is therefore an object of the present invention to provide a time base correcting apparatus in which incoming video signals are written into a memory by write clock signals modulated by time base errors and these written video signals are read from the memory by read clock signals modulated by velocity errors, and wherein malfunctions resulting from possible interference between the write clock signals and the read clock signals are prevented positively to assure highly accurate time base correction and reduction in the size and costs of the apparatus.

According to an aspect of the present invention, in a time base correcting apparatus in which incoming video signals are written into a memory by write clock signals modulated by time base errors and in these written video signals are read from the memory by read clock signals modulated by the velocity errors, the write clock and the read clock signals have different frequencies and fluctuations in the sampling positions, due to the frequency differential between the write clock signals and the read clock signals, are corrected by phase modulation of the read clock signals.

DESCRIPTION OF THE PREFERRED EMBODIMENTS

Figure 1:
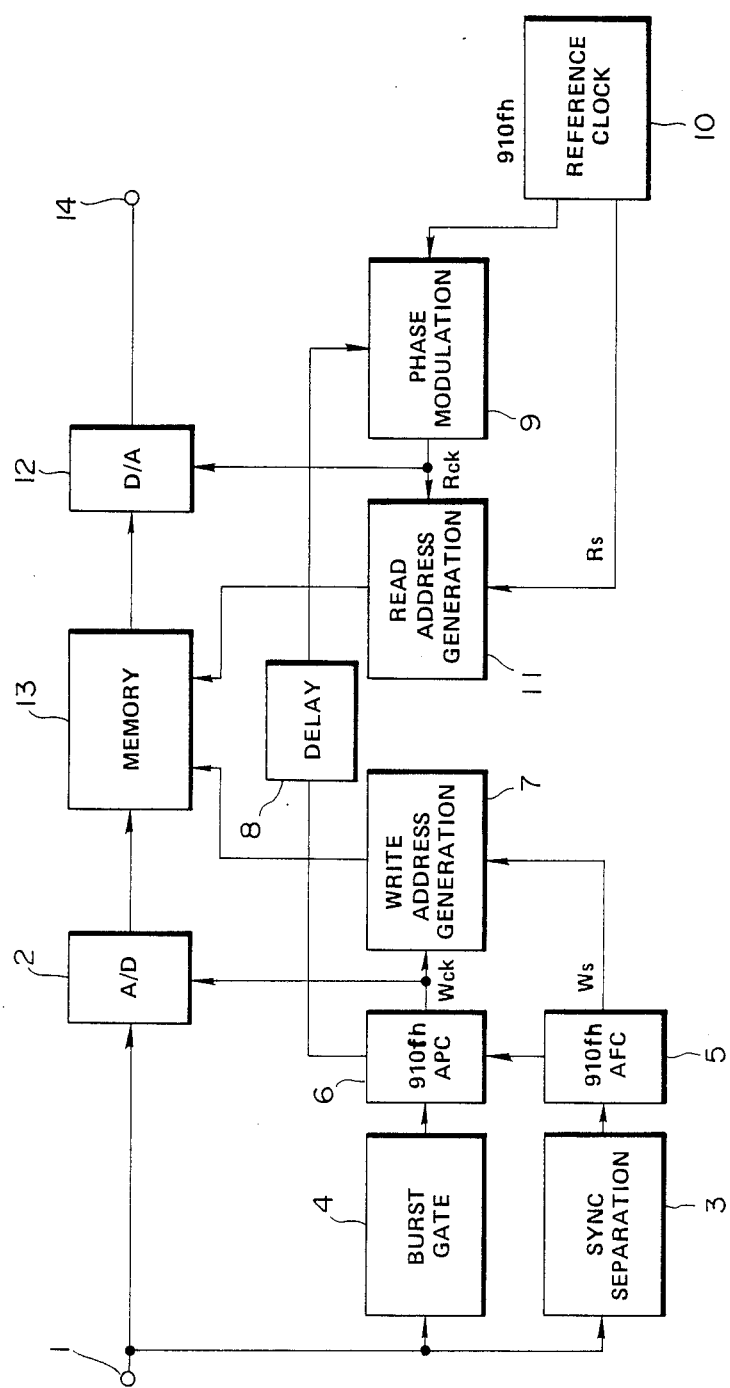
FIG. 1 is a schematic block diagram of a conventional time base corrector.

A preferred illustrative embodiment of the present invention will be hereinafter described in detail with reference to FIG. 2, wherein circuit elements corresponding to those shown in FIG. 1 are indicated by the same reference numerals.

Figure 2:
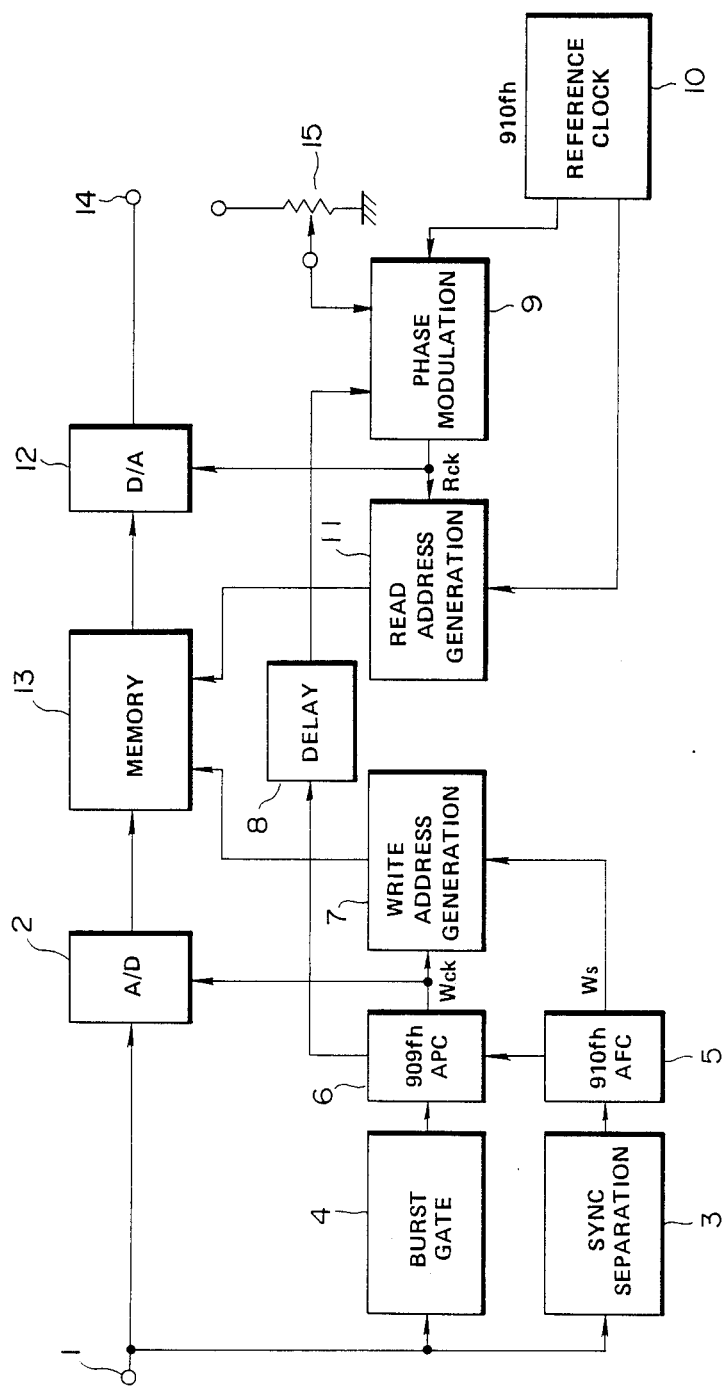
FIG. 2 is a schematic block diagram illustrating one embodiment of a time base corrector according to the present invention.

In the time base correcting apparatus shown in FIG. 2, reproduced video signals according to the NTSC system and containing time base fluctuations, such as are reproduced by a direct FM record system video tape recorder, not shown, are supplied to a signal input terminal 1.

These reproduced video signals are supplied from the signal input terminal 1 to the analog to digital (A/D) converter 2, and simultaneously to the sync separation circuit 3 and to the burst gate 4.

The sync separation circuit 3 separates sync signals contained in the reproduced video signals to supply horizontal sync signals to the AFC circuit 5. The burst gate circuit 4 separates the burst signals contained in the incoming reproduced signals to supply the thus separated burst signals to the APC circuit 6.

The AFC circuit 5 generates reproducing clock pulses having the frequency equal to 910 times the horizontal sync frequency fh, or 910 fh, that is, equal to four times the subcarrier frequency (fsc), or 4 fsc, on the basis of the horizontal sync signals separated from the reproduced video signals, and supplies the thus reproducing clock pulses to the APC circuit 6. The AFC circuit 5 also generates write start signals Ws at an interval of a horizontal scanning period (1 H), by frequency dividing the frequency of the reproducing clock pulses by 910, to supply the thus produced write start signals to the write address generating circuit 7. On the other hand, the APC circuit 6 generates write clock signals Wck having the frequency of 909 fh and effects phase control of such write clock signals Wck on the basis of a phase error obtained by comparison between the write clock signal $W_{CK}$ frequency divided by 909 and the reproducing clock pulse from the AFC circuit 5, also frequency divided by 909 and delayed by an amount corresponding to the difference between the periods of signals having frequencies of 909 $f_H$ and 910 $f_H$, respectively. The resulting write clock signals $W_{CK}$ accompanied by phase fluctuations associated with time base fluctuations of the reproduced video signals and having the frequency of 909 fh are supplied to the A/D converter 2 and to the write address generator 7. The APC circuit 6 also conventionally forms velocity error signals having the phase of the burst signals as the reference, that is, corresponding to the phase difference between the burst signals for successive horizontal periods, and supplies these error signals to the phase modulating circuit 9 through the analog delay circuit 8.

The A/D converter 2 digitizes the reproduced video signals by sampling them with the write clock signals Wck having the frequency equal to 909 fh. The video data obtained at the A/D converter 2 are written in the memory 13 in accordance with write address data formed at the write address generator 7 on the basis of the aforementioned write clock signals Wck and write start signals Ws.

The phase modulating circuit 9 is supplied with the reference read clock signals Rck supplied from the reference clock generator 10 and having the frequency of 910 fh, and phase modulates the read clock signals Rck in accordance with the velocity error signals supplied through the analog delay circuit 8. The resulting phase modulated read clock signals Rck are supplied from circuit 9 to the read address generator 11 and to the digital to analog (D/A) converter 12. The delay time of circuit 8 is selected so that the velocity error signal acting at any time in the phase modulating circuit 9 will correspond to the line of video data then being read out of the memory 13 in response to read address signals from the generator 11. As earlier noted, the frequency 910 $f_H$ of the read clock signals $R_{CK}$ is equal to four times the color subcarrier frequency $f_{SC}$, that is, there are four sampling points for each cycle of the color subcarrier signal $S_C$, and hence the successive sampling points corresponding to the read clock signals $R_{CK}$ with the frequency 910 $f_H$ are 90° apart along the waveform of the color subcarrier signal $S_C$. In the present embodiment, an offset voltage is applied from an offset circuit 15 to the phase modulating circuit 9. During each horizontal interval, the read clock signals $R_{CK}$ are progressively phase modulated or shifted in response to such offset voltage so that, at the completion of a horizontal interval, the last read clock signal $R_{CK}$ will be shifted by 90° of the subcarrier signal $S_C$, that is, by one sampling interval. By reason of the foregoing, the positions at which the video data digitized from the reproduced video signals are sampled by the reference read clock signals Rck having the frequency of 910 fh, are made to conform with respect to the sampling positions of the same video data by the write clock signals Wck having the frequency of 909 fh.

In the present time base correcting apparatus, the video data obtained in the A/D converter 2 by digitizing the reproduced video signals by sampling the latter with the write clock signals Wck formed in the APC circuit 6 2 are written into the memory 13 by using the write clock signals Wck accompanied by the phase fluctuations associated with the time base error and having the frequency of 909 fh. The video data thus written into the memory 13 are read from the memory 13 by using the read clock signals Rck initially having the frequency of 910 $f_H$ and which, in the course of a horizontal or line interval, have undergone the progressive phase shift or modulation corresponding to 90° of the color subcarrier, and the phase modulation associated with the velocity error signals in the phase modulating circuit 9. The data thus read out are then converted into corresponding analog signals in the D/A converter 12, such that the reproduced video signals corrected for time base errors are outputted at a signal output terminal 14.

In the above described time base correcting apparatus, the APC circuit 6 forming the write clock signals operates at the frequency of 909 fh, whereas the AFC circuit 5 forming the reproducing clock signals and the reference clock generator 10 forming the read clock signals Rck operate at the frequency of 910 fh, so that interference between these circuits and the resulting malfunctions may be positively eliminated even when the circuits are provided on the same circuit board, with the result that the time base correction may be performed with extremely high accuracy.

It is to be noted that the frequency of the write clock signals Wck is not limited to 909 fh as in the present embodiment, but may be selected to be any desired frequency other than the frequency of 910 fh of the read clock signals, such as 911 fh, so long as the frequency of the write clock signals is such as will allow the deviation in the sampling positions to be corrected by the phase modulation of the read clock signals Rck by the phase modulating circuit 9.

Figure 3:
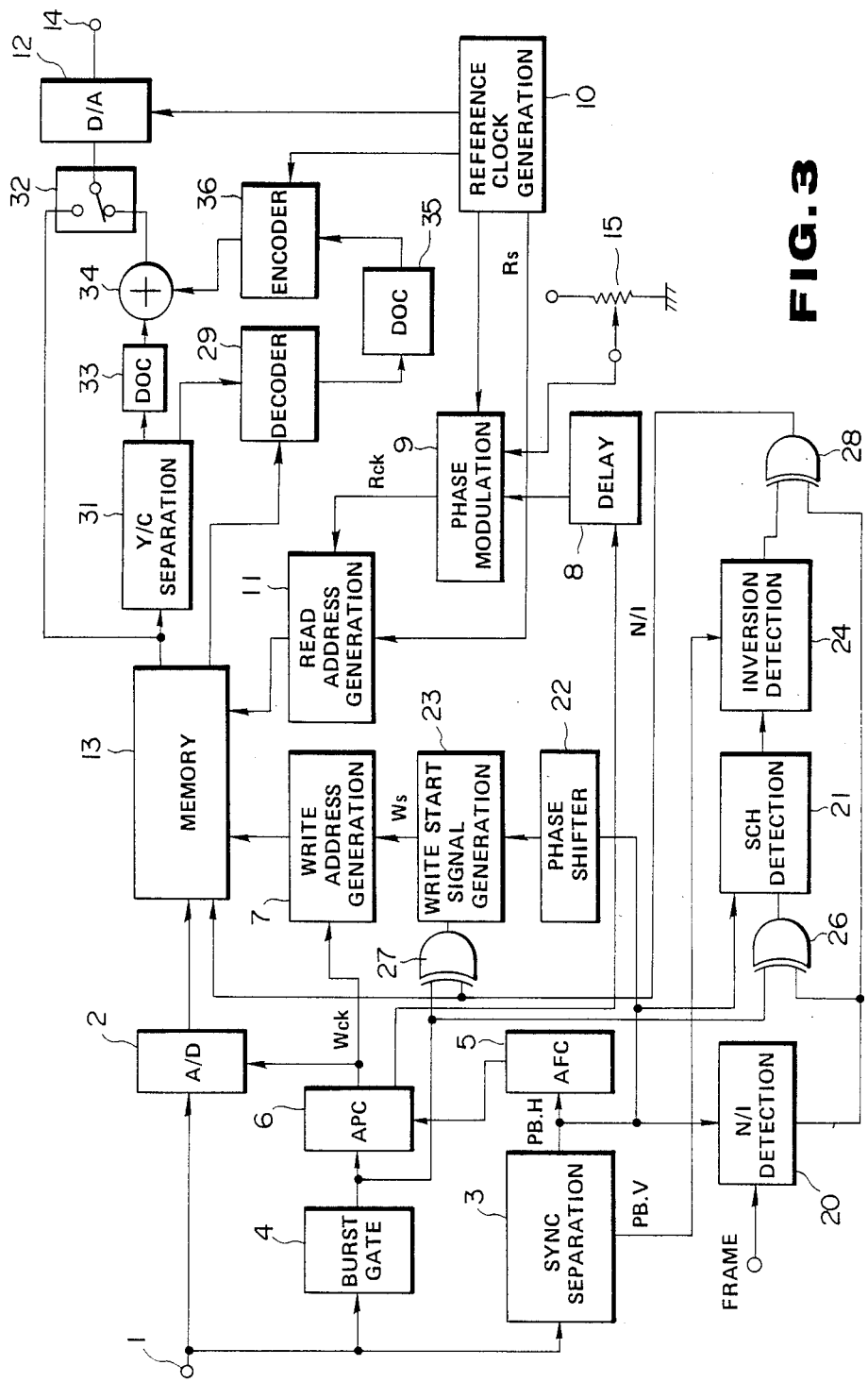
FIG. 3 is a schematic block diagram illustrating another embodiment of a time base corrector according to the present invention.

FIG. 3 illustrates another embodiment of a time base correcting apparatus according to the present invention in which time base correction can be performed routinely with high accuracy even for video signals reproduced from a video tape for which a forced editing operation has been performed in disregard of color frame phase matching or synchronization.

In the time base correcting apparatus of FIG. 3, the incoming reproduced video signals are again supplied from the signal input terminal 1 to the A/D converter 2, and are simultaneously supplied to the sync separation circuit 3 and to the burst gate circuit 4. The horizontal sync signals PBH and the vertical sync signals PBV are taken out at the sync separation circuit 3, while the burst signals are taken out at the burst gate circuit 4.

The horizontal sync signals PBH obtained at the sync separation circuit 3 are supplied to the AFC circuit 5, an N/I detector 20 and a SCH detector 21, and are simultaneously supplied through a phase shifter 22 to a write start signal generator 23. The vertical sync signals PBV obtained at the sync separation circuit 3 are supplied to an inversion detector 24.

The burst signals obtained at the burst gate circuit 4 are supplied to the APC circuit 6, and are simultaneously supplied through an exclusive OR 26 to the SCH detector 21. In addition, the same burst signals are supplied through an exclusive OR 27 to the write start signal generator 23.

The AFC circuit 5 forms, on the basis of the horizontal sync signals PBH supplied from the sync separation circuit 3, reproducing clock pulses having the frequency equal to 910 times the horizontal sync frequency fh, or 910 fh, that is, equal to four times the subcarrier frequency fsc, or 4 fsc, and supplies these reproducing clock pulses to the APC circuit 6. The APC circuit 6 forms, with the use of the phase of the burst signals supplied from the burst gate circuit 4 as the reference, and based on the reproducing clock pulses supplied from the AFC circuit 5, write clock signals Wck accompanied by phase fluctuations associated with the time base errors of the reproduced video signals, and supplies the resultant write clock signals Wck to the A/D converter 2 and to the write address generator 7.

The N/I detecting circuit 20 is supplied with frame pulses corresponding to color frames and forms the N/I signal, on the basis of these frame pulses and the horizontal sync signals PBH supplied from the sync separation circuit 3. Such N/I signal indicates the status of signal inversion of the burst signals of the respective lines that are in the state of correct color frame phase matching with respect to the color frames indicated by the frame pulses, in which the positive phase line and the negative phase line are indicated by the logic "0" and "1", respectively. The N/I signals obtained at the N/I detector 20 are supplied to the exclusive OR circuit 26, and are simultaneously supplied through an exclusive OR circuit 28 to the memory 13 and to the exclusive OR circuit 27.

The exclusive OR circuit 26 takes the exclusive OR of the aforementioned N/I signal and the burst signal to cause phase inversion of the burst signal of the oppositely phased line. In other words, the exclusive OR circuit 26 sets to positive the phase of the burst signal of the incoming video signals with correct color frame phase matching or synchronization, while inverting the phase of the burst signals devoid of color frame phase matching or synchronization before supplying the resultant signals to the SCH detector 21. The SCH circuit performs phase comparison between the burst signals supplied through the exclusive OR 26 and the horizontal sync signals PBH supplied from the sync separating circuit 3 to detect the reversely phased burst, signals and transmit the detected output to the inversion detector 24.

The inversion detector 24 forms, on the basis of the detected output of the SCH detector, 21 and the vertical sync signals PBV, an inversion detect signal which is the logic "1" for indicating a field with the reversely phased burst signal, that is, a field devoid of correct color frame phase matching, of the incoming video signals, and supplies the detect signal to the exclusive OR 28. The exclusive OR 28 reverses the polarity of the N/I signal formed in the N/I detector 20 by the detect output of the inversion detector 24 to form the N/I signal corresponding to the status of color frame phase matching of the incoming video signals. The N/I signal obtained at the exclusive OR circuit 28 is supplied through the memory 13 to a decoder 29.

The exclusive OR circuit 27, supplied with the N/I signals obtained at the exclusive OR 28, effects phase inversion of the burst signals from the burst gate circuit 4 by the aforementioned N/I signals only for the fields devoid of the color frame phase matching, or synchronization. The write start signal generator 23 synchronizes the horizontal sync signals PBH supplied from the sync separation circuit 3 through the phase shifter 22 with the burst signals supplied from the burst gate circuit 4 through the exclusive OR circuit 27 to form write start signals Ws which are transmitted to the write address generator 7. The write start signals generated at the write start signal generator 23 are designed so that the burst signals supplied from the burst gate circuit 4 through the exclusive OR circuit 27 are phase inverted by the aforementioned N/I signals only for the fields devoid of color, frame phase matching or synchronization so as to be shifted by 140 nanoseconds for effecting picture shift compensation.

The write address generator 7 forms write address data, on the basis of the aforementioned write start signals Ws and the write clock signals Wck supplied from the APC circuit 6, and the video data digitized from the aforementioned incoming reproduced video signals by the A/D converter 2 is written into the memory 13 in accordance with these write address data.

The read address generator 11 forms read address data, on the basis of the reference read clock signals Rck and read start signals Rs from the reference clock generator 10, and such read address data is used to read out the aforementioned video data sequentially from the memory 13. The video data read out from the memory 13 are supplied to a Y/C separation circuit 31, and are simultaneously supplied through a signal changeover circuit 32 to a digital to analog (D/A) converter 12.

The Y/C separation circuit 31 separates the video data read out from the memory 13 into luminance signal data and chroma signal data, and the luminance signal data and the chroma signal data are transmitted to a dropout compensating circuit 33 and to a decoder 29, respectively. The dropout compensating circuit 33 compensates the luminance signal data for dropout and transmits the dropout compensated luminance signal data to a data summing circuit 34. The decoder 29, supplied from the memory 13 with the N/I signals corresponding to the status of color frame phase matching or synchronization of the aforementioned video signals also read out of the memory 13, performs a decoding operation of phase inverting the chroma signals in accordance with the aforementioned N/I signals. The thus decoded chroma signal data are transmitted from the decoder 29 to an encoder 36 through a dropout compensating circuit 35. The encoder 36 performs an encoding operation of phase inverting the chroma signals in accordance with the reference decode signals supplied from the reference clock generator 10 to effect color frame phase matching or synchronization. The thus encoded chroma signals are transmitted from the encoder 36 to the data summing circuit 34.

The data summing circuit 34 combines the dropout compensated luminance signal data and the encoded chroma signal data into chroma-inverted video data which are supplied through the signal changeover circuit 32 to the D/A converter 12.

In the above described time base correcting apparatus, when reproduced video signals are supplied to the signal input terminal 1 from a video tape on which an editing operation has been performed in disregard of the color frame phase matching or synchronization, the chroma-inverted video data obtained at the summing circuit 34 are selected at the signal changeover circuit 32 so as to be then converted into corresponding analog signals by the D/A converter 12, such that time base corrected reproduced video signals are obtained at the signal output terminal 14 without picture shifting or chroma inversion at the portions devoid of color frame phase matching or synchronization.

Although preferred illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A time base correcting apparatus for eliminating time base errors from incoming video signals comprising:

memory means for storing said video signals;
   means for generating write clock pulses having a first center frequency which is modulated in accordance with said time base errors in the incoming video signals;
   means for generating read clock pulses having a second center frequency different from aid first center frequency;
   means for sampling said incoming video signals at sampling positions determined by said write clock pulses;
   memory control means for selectively enabling said memory means to write the sampling incoming video signals therein in accordance with said write clock pulses, and for selectively enabling said memory means to read out said video signals therefrom in accordance with said read clock pulses;
   means for sampling the read out video signals at sampling positions determined by said read clock pulses; and
   means for modulating said read clock pulses so as to compensate for deviations between said sampling positions at which said incoming video signals and said read out video signals would otherwise be respectively sampled by reason of the frequency difference between said first and second center frequencies.

2. A time base correcting apparatus according to claim 1, in which said means for modulating includes means for phase modulating said read clock pulses in accordance with a velocity error supplied from said means for generating write clock pulses.

3. A time base correcting apparatus according to claim 1, in which said means for modulating includes a phase modulator for shifting the phase of said read clock pulses in succession by a constant amount which is selected so as to be suitable for said frequency difference.

4. A time base correcting apparatus according to claim 3, in which said means for modulating further includes means for supplying a direct current voltage to said phase modulator for shifting the phase of said read clock pulses in accordance therewith, so that said sampling positions of the phase shifted read clock pulses output from said phase modulator are substantially the same as said sampling positions of said write clock pulses.

5. A time base correcting apparatus according to claim 4, in which said means for modulating further includes means for providing a velocity error signal from said means for generating write clock pulses to said phase modulator, and said phase modulator further modulates said read clock pulses in accordance with said velocity error signal.

* * * * *